UNITED STATES PATENT OFFICE.

WALDRON SHAPLEIGH, OF CAMDEN, ASSIGNOR TO THE ELECTRIC STORAGE BATTERY COMPANY, OF GLOUCESTER CITY, NEW JERSEY.

METHOD OF PURIFYING LEAD OR ALLOYS THEREOF.

SPECIFICATION forming part of Letters Patent No. 438,117, dated October 7, 1890.

Application filed April 17, 1890. Serial No. 348,386. (No model.)

*To all whom it may concern:*

Be it known that I, WALDRON SHAPLEIGH, a citizen of the United States, residing at Camden, in the county of Camden and State of New Jersey, have invented certain new and useful Improvements in the Method of Purifying Lead or Alloys Thereof, of which the following is a specification.

My invention relates to an improved method of purifying lead or lead alloy for use in the manufacture of frames or supports for battery plates or elements, in order that such frames or supports in their finished state or condition may have the qualities of purity, toughness, and density.

Heretofore in the manufacture of frames or supports for battery plates or elements it has been customary to fuse or melt lead or an amalgam of lead with or without antimony, and to cast the fused mass into frames or supports. However, when lead or lead compounds are fused in contact with the atmosphere, they become oxidized, and the metallic oxides so formed do not all remain upon the surface of the molten metal or metals, but become diffused through the mass. The frames or supports so produced are not pure, but contain small quantities of the oxides of leads. When such frames are employed for supporting plates or elements mounted in a cell in a suitable electrolyte, particles of oxide or oxides of lead are "formed" or peroxidized in a similar manner as the plates or elements themselves, and thus the frames or supports in a brief period of time not only become honeycombed or eaten away in spots, but are rendered useless.

The principal objects of my present invention are, first, to provide a simple and economical method of making a tough, compact, dense, and pure metallic frame or support for a battery plate or element which will not be formed or eaten away in use, and, second, to reduce the oxides of lead or lead alloy formed in and on the fused mass by contact with the atmosphere to a metallic state before casting.

My invention consists in fusing lead or an alloy thereof and then deoxidizing the mass before molding or casting, as hereinafter more fully described, and pointed out in the claim.

For the sake of explaining my invention, I will now proceed to describe a method of carrying the same into effect.

A charge of metallic lead or an alloy of lead and mercury or antimony, or both, is or are melted or fused in the usual manner, care being taken to keep the temperature of the mass as low as possible in order to maintain it in a sufficiently liquid or fluid condition. It will be evident to those skilled in the art to which my invention appertains that the oxygen of the atmosphere coming in contact with the surface of the molten lead or an alloy thereof will unite or combine therewith and form an oxide or oxides. The oxides do not altogether remain upon the surface of the molten mass as dross, but become absorbed and diffused throughout the same. Of course if the lead or lead alloy was then cast into a battery frame or support the diffused or absorbed oxides would be present in the finished product and would, when the frame was mounted in battery, become peroxidized or formed as the plates or elements themselves, and by being honeycombed or eaten away rendered not only useless but, in the falling of the particles therefrom, tending to continually short-circuit the battery. These serious objectionable features are entirely obviated by reducing the oxides to a metallic state or condition and freeing the mass from oxygen before the same is introduced into molds for the formation of frames or supports therefrom, and, moreover, for forming a more perfect alloy or union between the metals employed. In the practice of my invention these results are accomplished by introducing a small quantity—for instance, one-eighth to one-sixteenth of one per cent., more or less— of sodium into a molten mass composed of fused commercial lead previous to pouring the latter into suitable molds. The sodium may be readily introduced into the molten metallic mass by means of a cone-shaped ladle provided with a small perforation in the apex of the cone thereof, or made entirely of wire-gauze in the following manner: A small quantity of sodium is pressed into the cone and the ladle quickly introduced into the molten lead or alloy thereof, with, however, care being taken to hold the apex of the ladle upward for the escape of any air that may be contained therein. The sodium immediately combines or alloys with the lead, the sodium in this alloy being attacked by any oxygen present in the melted mass, forming caustic soda or sodium oxide and reducing the metallic oxides to a pure metallic state or condition. The sodium or caustic soda ultimately rises to the surface of the molten or liquid mass, where it assists in preventing further oxidation.

In practice excellent results have been obtained by the employment of an alloy of lead or lead and antimony with sodium in the proportion of one per cent., by weight, of the latter, (more or less,) and then employing this sodium alloy in the place of metallic sodium. It may be remarked that sufficient sodium or sodium alloy must be added to the molten mass, composed of lead or a lead alloy, to permit of the reduction or deoxidation of the oxides held in suspension or diffused throughout the same. The complete reduction or deoxidation of the oxides may be readily recognized by the brilliant and mirror-like aspect imparted to the surface of the molten mass, which it assumes by the use of the sodium or sodium alloy, so that it has more the appearance of mercury than lead. This appearance thus given to the mass serves as a guide of when the addition of the sodium or sodium alloy thereto shall cease. A frame or support so made from such a mass will be found to have a bright or silver-like appearance in its finished state or condition.

The molten mass being entirely freed from oxides may then be cast or molded into frames or supports for the plates or elements of the battery in the usual or well-understood manner, or may be used for many other purposes where it is desired that the product should possess the qualities of purity, toughness, and density.

Instead of introducing metallic sodium into the mass, for the purposes hereinbefore fully explained, potassium may be used in substantially the same manner; but from a standpoint of economy preference is given to the use of metallic sodium or sodium alloy for the accomplishment of the purpose of the invention.

Having thus described the nature and objects of my invention, what I claim as new, and desire to secure by Letters Patent, is—

The herein-described method of purifying lead or lead alloy for use in the manufacture of frames or supports for battery plates or elements, which consists in mixing sodium or sodium alloy or potassium or potassium alloy with said molten metal or an alloy of said metal in sufficient quantity to deoxidize the mass, whereby the oxygen is removed and a coating or film of caustic alkali is formed, which serves to protect the surface of the molten metal, substantially as and for the purposes set forth.

In witness whereof I have hereunto set my signature in the presence of two subscribing witnesses.

WALDRON SHAPLEIGH.

Witnesses:
GEO. W. REED,
THOMAS M. SMITH.